(12) United States Patent
Bellanger

(10) Patent No.: US 12,257,653 B2
(45) Date of Patent: Mar. 25, 2025

(54) INTERNAL CLAMPING AND WELDING DEVICE

(71) Applicant: SERIMAX HOLDINGS, Roissy en France (FR)

(72) Inventor: Guy Bellanger, Boulogne-Billancourt (FR)

(73) Assignee: SERIMAX HOLDINGS, Roissy en France (FR)

( * ) Notice: Subject to any disclaimer, the term of this patent is extended or adjusted under 35 U.S.C. 154(b) by 955 days.

(21) Appl. No.: 17/281,486

(22) PCT Filed: Oct. 1, 2019

(86) PCT No.: PCT/FR2019/052320
§ 371 (c)(1),
(2) Date: Mar. 30, 2021

(87) PCT Pub. No.: WO2020/070436
PCT Pub. Date: Apr. 9, 2020

(65) Prior Publication Data
US 2021/0402526 A1    Dec. 30, 2021

(30) Foreign Application Priority Data
Oct. 2, 2018    (FR) ...................................... 1859132

(51) Int. Cl.
*B23K 37/02* (2006.01)
*B23K 9/028* (2006.01)
(Continued)

(52) U.S. Cl.
CPC ........ *B23K 37/0282* (2013.01); *B23K 9/0284* (2013.01); *B23K 9/0286* (2013.01);
(Continued)

(58) Field of Classification Search
CPC .............. B23K 37/0282; B23K 9/0284; B23K 9/0286; B23K 37/0217; B23K 37/0276;
(Continued)

(56) References Cited

U.S. PATENT DOCUMENTS 4,306,134 A     12/1981  Slavens et al.
6,109,503 A *   8/2000   Parker ................ B23K 37/0531
                                                        219/125.11
(Continued)

FOREIGN PATENT DOCUMENTS

CN          107553023 A       1/2018
CN          107466260 B       11/2019
(Continued)

OTHER PUBLICATIONS

International Search Report issued on Jan. 16, 2020 in PCT/FR2019/052320 filed on Oct. 1, 2019, 2 pages.

*Primary Examiner* — Brian W Jennison
(74) *Attorney, Agent, or Firm* — Oblon, McClelland, Maier & Neustadt, L.L.P.

(57) ABSTRACT

An internal clamping and welding device for joining tubes by their distal ends, the device comprising movement means in order to be moved inside the tubes, separate clamping means for cooperating with the inner surfaces of the tubes to be welded, and a welding head mounted so as to be able to both rotate about a longitudinal axis of the tubes, and also pivot in order to be tiltable relative to a support of the clamping means.

17 Claims, 7 Drawing Sheets

(51) Int. Cl.
  *B23K 37/053*   (2006.01)
  *B23K 37/0531*  (2025.01)
  *B23K 101/10*   (2006.01)

(52) U.S. Cl.
  CPC ...... *B23K 37/0217* (2013.01); *B23K 37/0276* (2013.01); *B23K 37/0531* (2013.01); *B23K 2101/10* (2018.08)

(58) Field of Classification Search
  CPC ............ B23K 37/0531; B23K 2101/10; B23K 2101/06
  See application file for complete search history.

(56) References Cited

U.S. PATENT DOCUMENTS

| | | | |
|---|---|---|---|
| 10,646,967 B2 | 5/2020 | Wanner et al. | |
| 2004/0099713 A1* | 5/2004 | Laing | B23K 37/0531 228/119 |
| 2009/0230104 A1 | 9/2009 | Domec et al. | |
| 2010/0038404 A1* | 2/2010 | Lingnau | B23K 20/12 228/2.1 |
| 2012/0074205 A1* | 3/2012 | Dagenais | B23Q 3/186 228/102 |
| 2014/0091128 A1* | 4/2014 | Vanderpol | B23K 9/16 228/44.5 |
| 2016/0114436 A1* | 4/2016 | Lacome | B23K 37/0531 29/559 |
| 2018/0029154 A1* | 2/2018 | Rajagopalan | B23K 9/0286 |

FOREIGN PATENT DOCUMENTS

| | | |
|---|---|---|
| EP | 1 148 969 B1 | 11/2004 |
| FR | 2 485 974 A2 | 1/1982 |
| FR | 2 727 643 A1 | 6/1996 |
| JP | 55-36011 A | 3/1980 |
| RU | 81 450 U1 | 3/2009 |
| RU | 2407618 C2 | 12/2010 |
| WO | WO 2016/153562 A1 | 9/2016 |

\* cited by examiner

INTERNAL CLAMPING AND WELDING DEVICE

The invention relates to an internal device for clamping and welding tubes disposed end to end ("internal line-up welding clamp"). The invention finds its application more particularly in the field of the construction of metal pipelines generally used for the delivery of gas, oil or other products of the petroleum industry. In particular, it relates to pipelines built on land. The invention can also be useful for water supply.

The construction of metal pipelines consists in circumferentially welding the distal ends of tubes provided opposite each other. The distal ends of the tubes are previously machined by pieces of equipment which allow the formation of a chamfer on the distal end, this chamfer is defined in a plane which is "almost perfect" but which is never perfect. In practice, this plane defined by the edge of the chamfer systematically has a slight tilt relative to the longitudinal axis of the tube called "squareness defect", it can also have flatness defects of the order of tenths of a millimetre given the precision of current chamfering machines.

To weld them, the tubes thus prepared are provided in alignment with one another and disposed so that their distal ends are aligned and provided as close as possible, or even in contact, with one another in order to limit the volume of the weld junction. To optimise welding, it is important to fixedly maintain the tubes aligned and centered during the welding operation.

Welding can be done from the outside. In this case, plates can be placed inside the tubes, in line with the junction of said tubes, to prevent the weld pool deposited in said junction from collapsing inside the pipe. The documents U.S. Pat. Nos. 6,915,943 and 5,356,067 show examples of internal clamping devices implemented during the formation of the weld from the outside.

Pipeline builders are looking for alternatives to this technology to keep up with changing customer specifications, in particular in terms of productivity. To dispense with the use of these plates, it is a known practice to weld the ends of the tubes from the inside, in order to join the distal ends of the tubes edge to edge around their entire circumference by making a first internal weld. Once this first internal weld, or root pass, has been completed, a weld from the outside with a second piece of equipment can be carried out in a conventional manner, with the internal weld acting as a support for the external weld.

In particular, in the prior art, a device is known for welding, from the inside, tubes disposed end to end, of the type including a frame supporting means for moving said device forward in the tubes, said frame comprising a front frame and a rear frame connected by a shaft, a first clamping means disposed at the front of the rear frame and intended to cooperate with the end of a first tube in order to longitudinally centre and immobilise said device relative to the first tube, a second clamping means disposed at the rear of the front frame and intended to cooperate with the end of a second tube in order to maintain the two tubes end to end during at least the welding operation, and a welding device comprising a rotating crown disposed between the first clamping means and the second clamping means, and at least one welding torch carried by said rotating crown and disposed approximately in the plane of joining the two tubes to be welded at least during the welding operation, alignment means capable of cooperating with the end face of said first tube in order to position said torch approximately in the joint plane, means for power supplying said torch, shielding gas and optionally a weld metal, and means for controlling said device.

Such devices are known in particular from documents U.S. Pat. Nos. 3,461,264 and 3,612,808 which provide a certain degree of freedom between the rear frame and the first clamping means, in order to allow alignment between a clamping plane defined by the first clamping means and the joint plane, the alignment means then cooperating with the end face of the first tube.

In all these devices, the means which allow the degree of freedom mentioned above are remote from the joint plane of the two tubes.

The alignment of the axes takes place in two phases, the first phase consists in placing the geometric axis of the clamping means, the one around which each piston of the clamping means deploys radially, perpendicular to the joint plane defined by the end face of the first tube, and the second phase consists in radially moving the geometric axis of the clamping means so that it coincides with the perpendicular to the joint plane which passes through the geometric axis of the first tube. The first phase is obtained by deploying the alignment means outward and abutting the alignment means on the end face of the first tube by moving the device back into the first tube. The second phase is obtained by actuating the clamping means of the first clamping means.

Document FR-2 727 643 teaches an alternative solution for internal welding wherein the first clamping means, the second clamping means and the welding device are all carried together by a hub surrounding a shaft connecting the rear frame and the front frame, said hub being supported by said shaft by means of a ball joint disposed substantially in the plane of the rotating crown.

In these known devices, a radial movement inevitably occurs during the first phase. During the second phase, a radial movement and a shifting of the alignment means relative to the end face of the first tube also occur. At the end of the second phase, an imbalance is observed in the distribution of the forces exerted by each of the pistons. The device according to document FR-2 727 643 allows to limit shifting phenomena, but contributes to a deterioration in the centering of the geometric axis of the first clamping means on the geometric axis of the first tube. De facto, with such a device, the problems called "hi-lo" problems, namely the problem related to the existence of an offset between the end faces of the tubes is increased.

Document U.S. Pat. No. 4,306,134 discloses an internal clamping and welding device which allows to orient the torch so that it can be disposed obliquely relative to the joint plane. Screws allow to fix the oblique of the orientation of the welding head. During circumferential welding, the torch oblique remains the same relative to the joint plane. The welding torch is also oscillated to produce a wide weld pool between the two tube ends.

Finally, since this type of device is very heavy (of the order of several tonnes), it requires the use of specific lifting means. Likewise, the tubes are also heavy. When the second tube is approached, also by means of a lifting tool, in order to be placed facing the first tube, it is necessary that the protruding part of the front frame is inserted into said second tube. In practice, the precision of tools for lifting and handling the tubes, as well as for moving clamping and welding devices, does not allow absolute precision. It therefore very often happens that the introduction of the second tube leads to the exertion of forces on the front frame, and in particular on the first clamping means. Such constraints will affect the previously adjusted position of the hub carrying together the first clamping means, the second clamping means and the welding device. When the second tube is finally in an acceptable position facing the first tube, it is therefore no longer possible to know what the position of the welding head is relative to the distal end of the first tube, with regard to the various impacts transmitted to the internal device.

Therefore, there is a need to facilitate the placement of the second tube, which allows to maintain the position adjustment of the welding head, including when impacts are made on the device by the second tube.

Moreover, due to the existence of an almost systematic circularity defect on the tubes, and the existence of cases called "false cut" cases, namely cases where the end face of the first tube is not perfectly perpendicular to the longitudinal axis of said tube, a need has since been identified to increase the compatibility of tubes placed end to end.

A need has also been identified for devices capable of increasing their tolerance to "hi-lo" problems, while ensuring an efficient and complete weld bead. An efficient weld bead ensures complete sealing of the space to be welded between said end faces. Indeed, the work of pairing the tubes by rotating the second tube placed facing the first tube being tedious, the need to limit the offsets between these end faces was identified.

A need has also been identified to improve the internal geometry of the weld bead in order to improve their resistance to fatigue, and in particular to limit local variations in the internal section of the tubes in order to avoid the risk of cavitation.

The object of the present invention is to allow to maintain the coaxiality of the device, and more particularly of the deployment axes of the two clamping means with the axis of symmetry of the first tube, while conferring a degree of freedom to the welding head relative to this axis of symmetry, the degree of freedom being conferred by a pivot capable of tilting the welding head in order to wedge the alignment of the welding head with the plane of the front end face independently of the first clamping means. The invention can also allow a translational movement of the pivot along the longitudinal axis of the device by having a useful stroke between the two clamping means.

The object of the invention allows to withstand stresses exerted by the supply of the second tube which can reach up to 20 or even 30 to 40 axial tonnes and 40 radial tonnes.

The object of the invention is to provide a technical solution to the above problem by providing an internal clamping and welding device for joining tubes by their distal ends, the device including
- a support including a first clamping means to cooperate with the inner surface of a first tube, and a second clamping means to cooperate with the inner surface of a second tube,
- a welding head mounted to rotate about the support, so as to allow welding on at least a portion of the internal circumference of a junction area formed between the first tube and the second tube;
- a pivot such that the welding head is tiltable relative to the longitudinal axis of the device, the pivot being such that the welding head is tiltable relative to a clamping plane of the first clamping means. In particular, the welding head is rotated in a plane, this plane being tiltable relative to the longitudinal axis of the device. This means that when performing the circumferential path around the support, the welding head remains in the same plane. The welding head does not require tilt adjustment during welding. A tilt angle of the welding head relative to the longitudinal axis of the first tube remains the same at all times during welding.

De facto, the invention allows to provide a welding head which is tiltable relative to a longitudinal axis of the support, this longitudinal axis of the support being able to merge with the longitudinal axis of the device, and thus be to be tilted identically to the tilt of an end face of the tube relative to the longitudinal axis of the tube. The invention also allows the circular path of the welding head to be tilted relative to the clamping plane in order to provide a path for the welding head that best matches the tilt of the end face of the tube. The invention allows to register the path followed by the welding head in a plane and to centre this plane on a plane of a distal end of the first tube. The plane wherein the end of the welding head is rotated can thus be coincident with the plane of the distal end of this first tube.

Preferably the pivot can be located between the two clamping means. More preferably, the pivot can be within the volume of the junction area delimited laterally by the two distal end faces placed end to end with the first tube and the second tube. To encompass all cases, and in particular those where there is a defect in circularity of the first tube, the weld bead to be formed is defined as having to form an ellipse. Preferably the ball joint is in the plane of said ellipse, and better still at the barycentre of said ellipse, in order to minimise the variations in distance between the welding torch and the inner surface of the tubes during circumferential welding.

With a device according to the invention, the axis of rotation of the welding head can pass through the centre of the ellipse, including when the ellipse is defined in a plane tilted relative to the longitudinal axis of the tube (case of the "false cut"). In particular, the device according to the invention can compensate for the tilts of the end face of the first tube relative to the longitudinal axis of the tube ranging up to 0.5° or 10 mm measured axially.

With a device according to the invention, the optimisation of the positioning of the welding head relative to "false cuts" can be achieved.

In addition, in the event of an impact on the protruding part of the device, the first clamping means will absorb the stress while allowing preservation of the orientation of the initially defined welding head. The configuration and the way wherein the first clamping means is placed in the first tube will allow to increase the resistance to backward movement and therefore to the shifting of a device according to the invention.

The welding head is provided to be rotated over at least one angular arc defined transversely to a longitudinal axis of the device while maintaining its orientation. With such a configuration, for forces transmitted to the device during docking of the second tube reaching up to 15 tonnes, the first clamping means allows to guarantee the definition of the reference frame useful for the positioning of the welding head. With such a shock, only an acceleration component is transmitted to the welding head, but not the forces, because the welding head according to the invention is independent of the first clamping means.

In particular, the welding torch can be an arc welding torch. An arc welding torch includes a continuously fed electrode wire and an electrode that emits an electric arc across the wire to produce a weld pool at a determined impact point. This electrode is oscillated, the oscillation being such that the electrode at rest is in the plane of the distal end of the first tube, which is also the plane wherein the welding torch is located. The oscillation of the electrode is chosen to be symmetrical on either side of this plane. An oscillation amplitude of the electrode of a torch according to the invention can be reduced to a value less than 3 mm in amplitude, because the objective of the oscillation is to fill only the radial and/or axial deviations of less than 1 mm, preferably less than 0.5 mm, between the tubes.

Thus a weld pool where the metal weld wire is melted will create a weld bead. The point of impact of the electric arc produced by the electrode therefore follows a sinusoid centered on the joint plane. The weld impact point is chosen in the junction area defined between the two tubes facing each other. Thanks to the invention, the path of the impact points is centered on the joint plane when the welding head is rotated, this centering plane of the impact points being the plane of the first end of the first tube. In particular, when rotating the welding torch, the body of the torch will remain in the same plane, and thus allow the production of a weld bead only in the chamfer of the two tubes, without risk of local decrease in the internal diameter of the tubes.

In particular, the distal ends of the two tubes are both chamfered so that the weld bead to be produced has a thickness less than the thickness of the tube.

Preferably, the welding head includes several, in particular at least four, and for example eight, separate welding cassettes distributed over the circumference of a crown, each cassette being able to execute a proper welding program specific to an angular portion of the circumference of the joint to be made. Preferably, all cassettes perform the same welding program. Depending on the radial compactness required by the internal diameter of the tubes to be welded, provision can be made for example of 6 separate welding cassettes distributed over the circumference of a crown of a device according to the invention for making welds in a tube of 91.5 cm (36 inches) of external diameter, for nominal pipe wall thicknesses comprised between 8.5 and 27 mm.

Preferably, the cassettes are distributed over the same crown so that a single motor allows all the cassettes of the welding head to be driven simultaneously.

Each cassette can be programmed to cover an angular arc partly overlapping with the angular arc covered by an adjacent cassette. According to the invention, when rotating the welding head, each of the welding cassettes makes a path in a plane, this plane being the same for each of the cassettes, and being superimposed on the plane of the distal end of the first tube.

In particular, when there are several welding cassettes, each of the cassettes allows arc welding so that the electrodes of each of these cassettes are disposed in the same plane.

Advantageously, the pivot can be axially movable between the two clamping means. Thus, the pivot can be placed in a parking position during the operations of placing the first clamping means in cooperation with the inner wall of the first tube, and it is only in a second step that it is translated so as to be able to be disposed in line with the joint plane.

For example, the pivot can be obtained by a ball joint, the ball joint including a female ball joint and a male ball joint interlocked with a female ball joint. In particular, an outer surface of the male ball joint has a curvature complementary to that of an inner surface of the female ball joint. For example, the outer surface has a convex surface and the inner surface has a concave surface, such that a radius of curvature considered in a longitudinal section of said curved surfaces, respectively concave and convex, is comprised between 500 mm and 1000 mm, for example of the order of 700 mm when the device is configured to be inserted into tubes of 1.22 metres (48 inches) of external diameter. The female ball joint is connected to a crown of the welding head, while the male ball joint is provided by the support.

Optimally, the crown can include a means for meshing on only a portion of its inner circumference to cooperate with a toothed pinion carried by the female ball joint. The crown is thus rotated by this motorised toothed pinion. The rotation of the crown relative to the female ball joint can be facilitated by rollers, for example evenly distributed, at an interface between the crown and the female ball joint. The rotating motorisation can also be provided by other means such as a "torque motor" directly integrated into the crown.

Alternatively, the pivot could also be obtained by means of a device of the "Hexapod" type, which allows to create the equivalent pivot point. A device of the "Hexapod" type can be fixed outside the volume delimited by the two clamping means.

Advantageously, the device may include means for identifying the tilt of a plane defined by the distal end of the first tube. The device may also include means for indexing the tilt of the welding head relative to a tilt plane of the distal end of the first tube, the indexing means being able in particular to cooperate by direct mechanical abutment against the tilt identification means. Alternatively, the means for indexing the tilt of the welding head can cooperate directly with the distal end of the first tube.

Preferably, the indexing means are integral with the welding head. Advantageously, the indexing means may include means for blocking in position in order to maintain the position of the welding head identified as aligned with the plane of the distal end of the first tube.

For example, the indexing means may include indexing fingers carried by the crown, these indexing fingers being able to be contacted with a crutch and upper abutments of the tilt identification means.

Preferably, the device may include proper means for adjusting the coaxiality of the device in the first tube. The first clamping means can ensure the concentricity of the device in the first tube. Preferably, the second clamping means ensures the alignment of the second tube with the first tube.

In particular, each clamping means may respectively include a plurality of pistons, for example 24 pistons each, each piston being able to exert a radial pressure greater than 10 tons, and for example of the order of 15 tons. The movement of the pistons can in particular be done in a synchronised and homothetic manner, such that the ends of each piston move in concentric circles. With such forces, the clamping means partly enables the rounding of the portion of the tube against which it is radially resting.

The first and second clamping means may be close and in particular axially spaced along the longitudinal axis of the tubes such that they are less than 400 mm, in particular less than 300 mm of axial distance. Such a configuration allows great axial compactness, and also a positioning of each of the clamping means as close as possible to the junction area formed between the first and the second tube. Such a configuration allows to recircularise tubes which have partial circularity defects, in particular due to their structure: tubes welded longitudinally or in a spiral.

The object of the invention is also a method for welding by means of an internal clamping and welding device according to the invention such that it includes the following steps:
- longitudinally inserting the device into a first tube,
- deploying a low crutch of a front frame of the device in order to limit the longitudinal insertion into the first tube when the crutch contacts a distal end of this first tube,
- placing the first clamping means to axially fix the position of the device in the first tube, the first clamping means extending in a plane P1,
- creating a plane reference frame PR of the distal end of the first tube using three points of contact with the distal end, in particular one point of contact by the crutch and two other points of contact by two deployable upper telescopic abutments of the frame,
- indexing the plane of the crown carrying the welding torch on the plane reference frame PR by translating the crown along slide bars and contacting fingers carried by the crown with the crutch and the two upper abutments,
- blocking the crown in the longitudinal and tilted position relative to the plane P1.
- placing a second tube facing the first tube.

Preferably, the crown can be translated by lateral bearings on a female ball joint of the pivot causing a male ball joint of the pivot to slide on slide bars.

In particular, after blocking the crown in a longitudinal and tilted position relative to the plane P1, and before the supply of the second tube, the crutch and the two upper telescopic abutments can be retracted into the first tube.

The present invention will be better understood by studying the detailed description of an embodiment taken by way of non-limiting example and illustrated by appended drawings, wherein.

The appended drawings may not only serve to complete the invention but also contribute to its definition, where appropriate.

Figure 1:
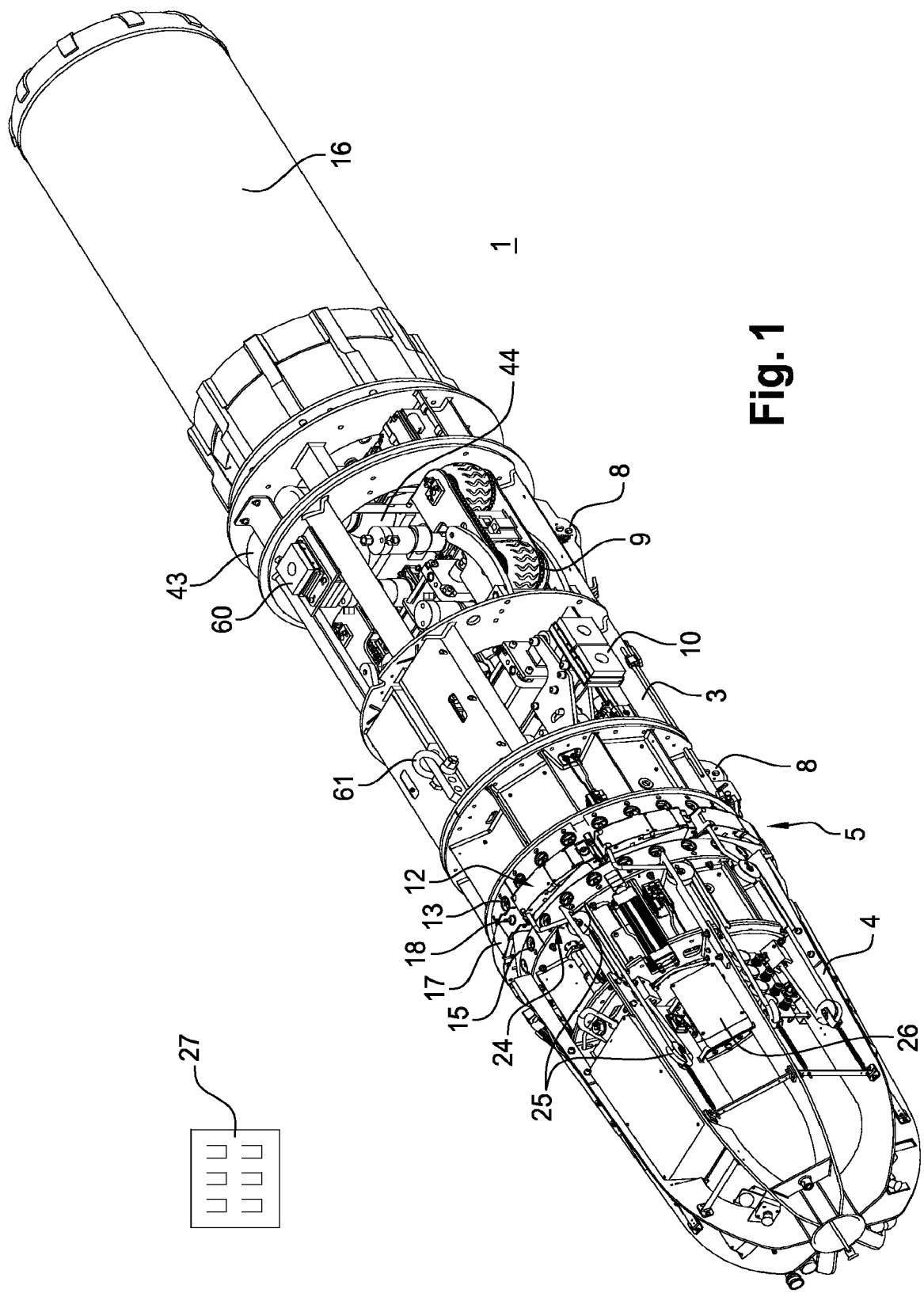
FIG. 1 is a perspective view of a device according to the invention in a first tube.

FIG. 1 shows an interior device 1 according to the invention. The device 1 includes a frame 2, said frame 2 comprising a front frame 4 and a rear frame 3 connected by a support 5 of the device 1. In operation, the rear frame 3 is disposed inside the first tube 6. The first tube 6 includes a distal end 7 to be welded to a second tube, not shown. Before supplying the second tube, the front frame 4 forms a protruding part projecting from the first tube.

Figure 2:
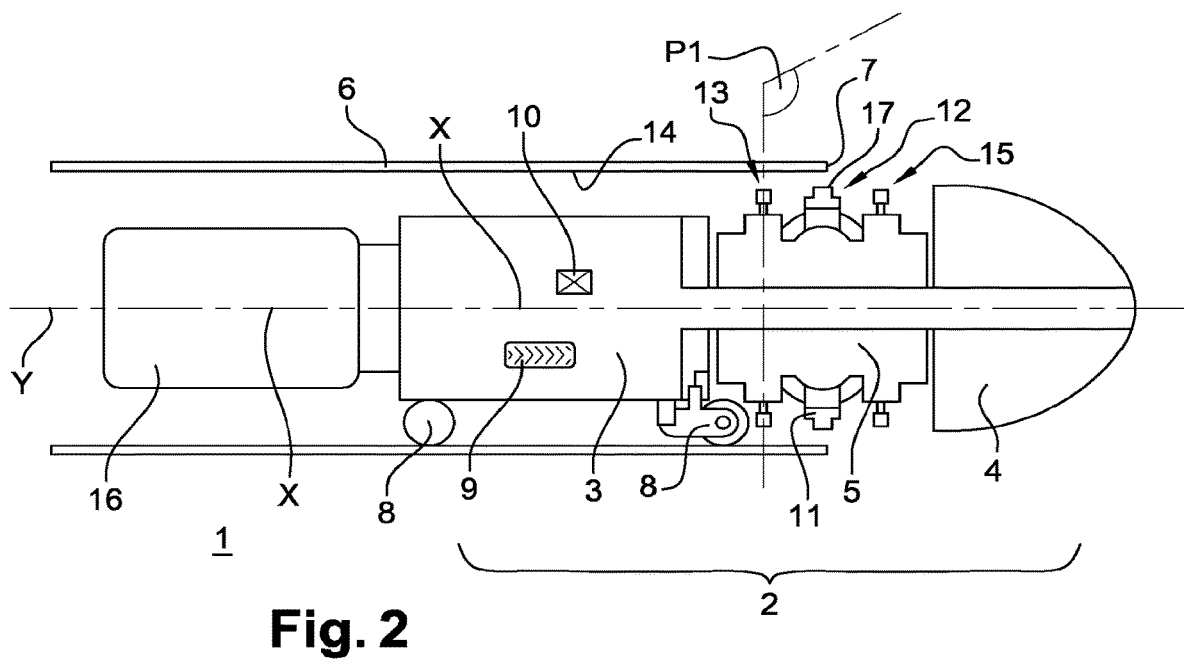
FIG. 2 is a schematic longitudinal sectional view of a device according to the invention.

To place the device 1 in the first tube, the rear frame 3 includes movement means to be moved inside the tube. The movement means include carrier wheels 8, drive wheels 9 and brakes 10, better identified in FIG. 2. The carrier wheels 8 support the weight of the device 1, while the drive wheels disposed laterally on either side of the device do not support such a weight.

The movement means allow to adjust the parallelism between the longitudinal axis Y of the first tube and the longitudinal axis X of the device 1. These carrier wheels 8 allow both axial and radial movement of the device inside the first tube. The brakes 10 can laterally contact the tube. To contact the top and the bottom of the tube, the device includes diametrically opposite backing pads 60, to help in the internal centering of the device in the tube. These backing pads are particularly useful when inserting the device 1 into a tube, when the device 1 is lifted and held by the lifting ring 61.

The device 1 includes a crown 11 provided with a welding head 12. The crown is movably mounted around the support 5. The purpose of placing the device 1 in the first tube is to place the crown in the joint plane, and that the welding head points to an edge of the distal end 7. The welding head is in particular power supplied by a power generator located outside the tube, a connection between the welding head and the power generator passing through the front frame 4.

Indeed, once the weld bead is produced, the device is then controlled to move forward to the new free end of a tube newly connected to the first tube. The wheels are adjusted to ensure a straight path of the device in the tube. The brakes 10 are adjustable to the internal diameter of the tube.

The protruding part of the front frame has an oblong shape substantially in the shape of a cone rounded at the top. The front frame 4 forms a visual mark and facilitates the alignment of the second tube, while tolerating a sliding of this second tube on its outer surface.

When supplying the second tube, it is necessary to immobilise the device 1 in the first tube. To this end, the support 5 includes a first clamping device 13 intended to cooperate radially with the inner wall 14 of the first tube. When the second tube is brought opposite the first tube, and before the implementation of the welding head, a second clamping device 15 of the support 5 is provided to cooperate radially with an inner wall of this second tube.

Figure 6:
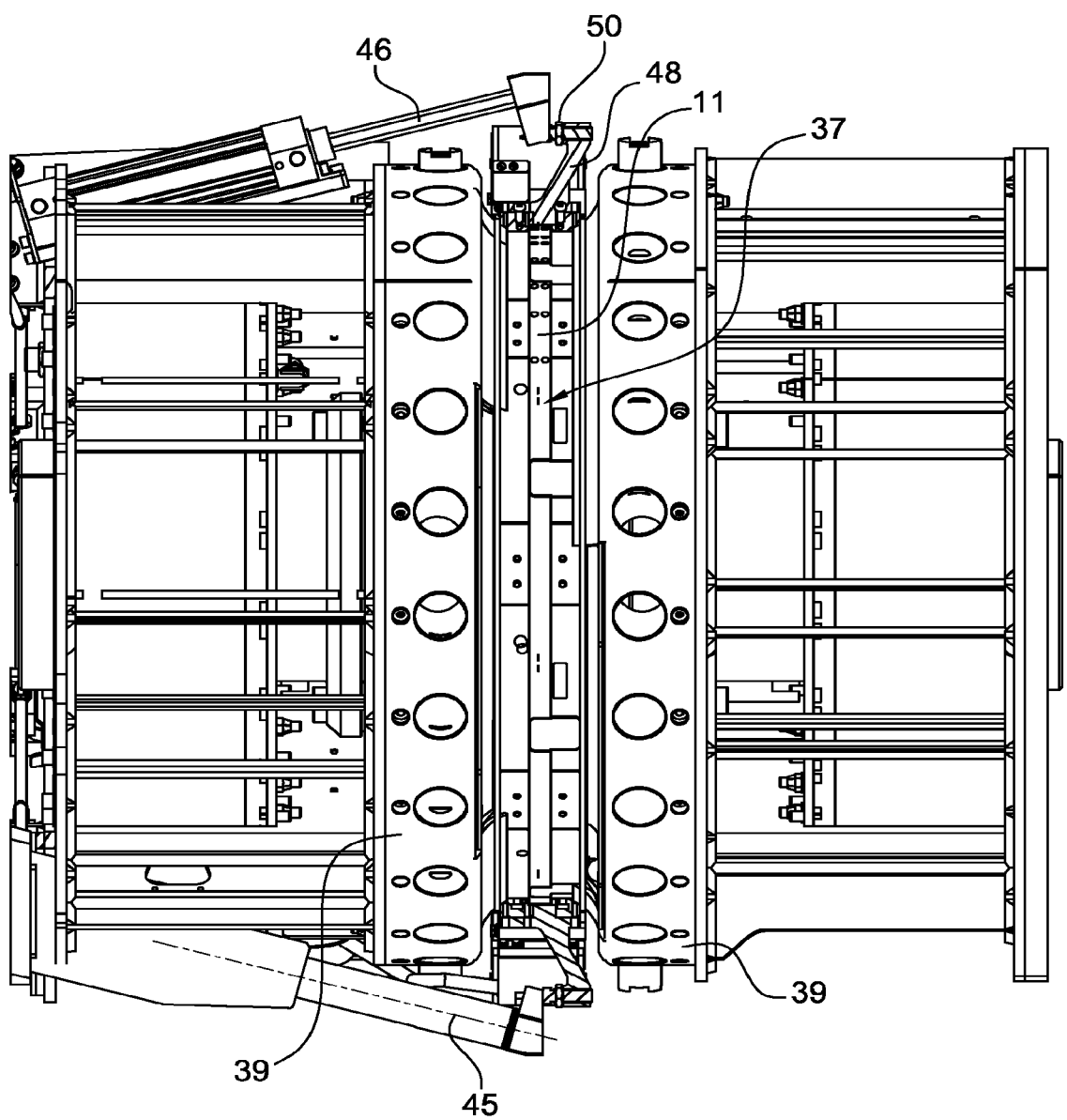
FIG. 6 is a side profile view of part of the device according to the invention allowing to view the means for indexing the tilt of the welding head of a device according to the invention, the part shown not including the welding head.

The first clamping means 13 includes in the example a cylinder, a hub pushed by the cylinder and pistons carried by the hub and radially distributed relative to the longitudinal axis X, so that the pressure of the cylinder allows contacting the pistons with the inner surface 14. FIG. 1 shows only part of the clamping means, indeed, in this view, the pistons are not shown there provided with their piston head. To be operational, each piston is surmounted by a piston head which carries a roller rotatable about an axis integral with the piston. In FIG. 1, the pistons without piston head are shown in the retracted position, while in FIG. 6, where two radially opposite pistons are shown for each of the clamping means 13 and 15, the pistons—again without their piston head—are shown in the extended position.

For example, the set includes 24 pistons, preferably evenly distributed, to create respectively diametrically opposite points of contact. The cylinder is supplied by a reserve of compressed air 16 carried at the rear of the rear frame 3.

The second clamping means 15 is in the example of a configuration similar to the first clamping means 13.

The device 1 includes independent control means for independently controlling the first clamping means 13 and the second clamping means 15 for their respective cooperation with the inner walls of the tubes. The clamping means 13, 15 can be deployed asynchronously. Thus, the second clamping means 15 can contact the inner wall of a second tube, while the first clamping means 13 already cooperates with the inner surface 14.

The device 1 according to the invention also includes a remote console 27 of the device placed in the tube. This console 27 remote controls the means for moving the device in the tube, as well as the clamping means 13 and 15.

The crown 11 is rotatably mounted about the support 5, between the two clamping means 13 and 15. The front frame 4 includes a logic controller 26 for controlling the welding cycle. The logic controller 26 is power supplied by an on-board battery 43 disposed at the rear of the rear frame 3. The logic controller 26 can be remotely controlled by a second console located upstream of the second tube. The logic controller 26 may include a control interface to allow the launch of preparatory tests for the production of the weld bead.

Figure 3:
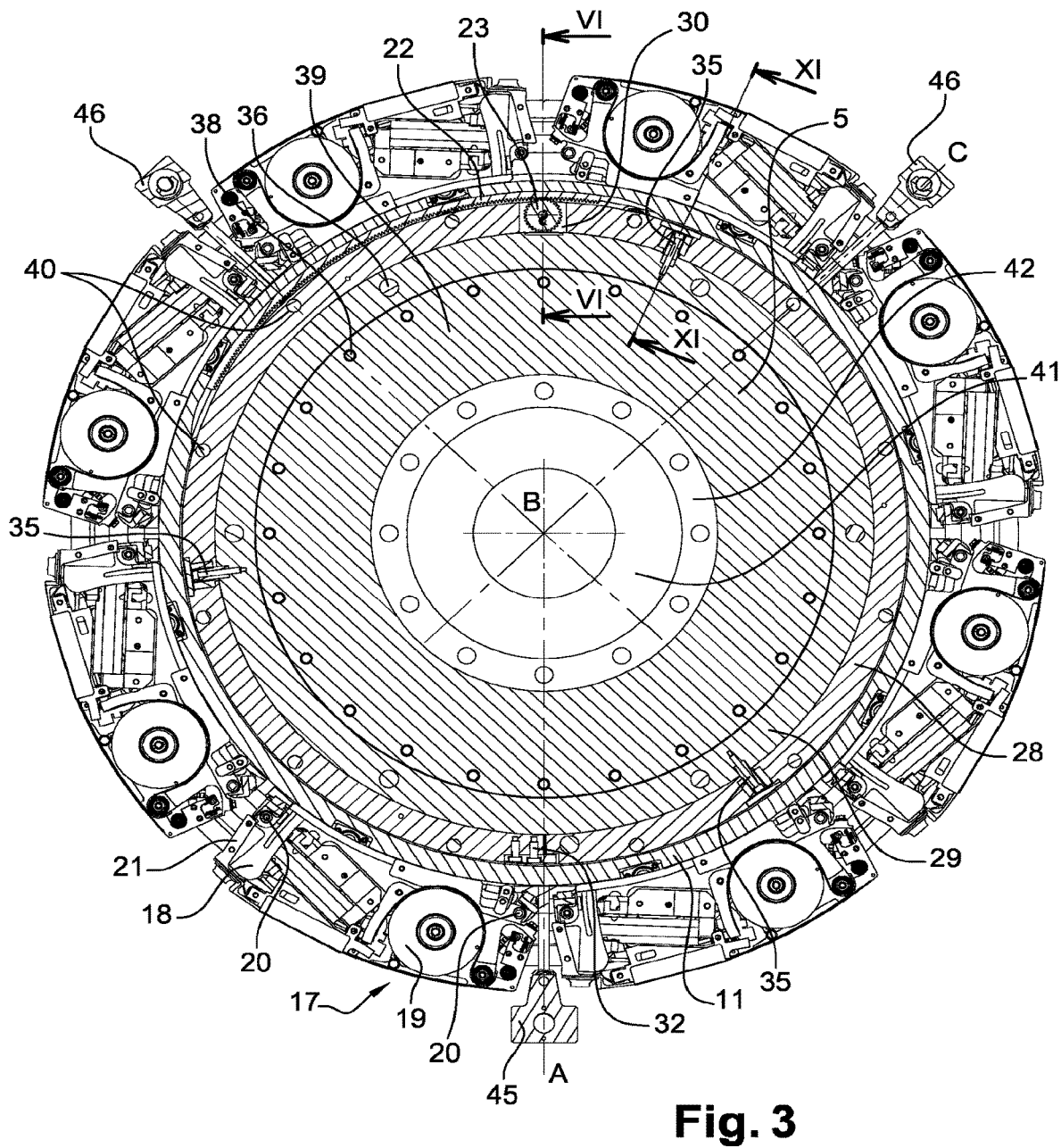
FIG. 3 is a cross-sectional view along the section plane III-III identified in FIG. 1 of a device according to the invention.

The welding head 12 includes several welding cassettes 17. In the example of FIG. 3, the crown carries 8 cassettes such as 17, here all identical, together forming the welding head 12. The 8 cassettes are of a size such that it substantially covers the entire circumference of the crown 11. Thus each cassette allows to ensure an angular arc of the weld bead to be produced.

The cassette covers an angular arc of the crown 11. The cassette includes a torch 18 pointing radially towards one of the edges of said angular arc. The torch 18 is for example of the MIG or TIG type. Preferably, the torch is oscillating so as to oscillate along the longitudinal axis X, and thus allow the production of a bead larger than the diameter of the wire fed in the torch. Each cassette includes an on-board wire coil 19 to power its torch.

The torches are power supplied for each cassette via an umbilicus 24, the path of which is framed by a mechanism 25 with pulleys and reels carried by the front frame 4. The cables for power supplying the torches 18 arrive at the front frame 4 from the second console. The inerting gas necessary for the welding operations is stored in a buffer tank 44 disposed at the rear of the rear frame 3. The buffer tank 44 is re-supplied with inerting gas by means of conduits also coming from the second console, via a central hollow shaft. Finally, the compressed air necessary for the implementation of the cylinder connected to the pistons is also supplied from this second console.

The cassette 17 forms a casing removably mounted on the crown 11. There is thus no loss of time when it is necessary to renew the coil or the torch. In addition, the cassette includes lateral means 20 for adjusting the position of the cassette on the crown, in order to allow an adjustment of the coplanarity of the torches provided by each of the cassettes in the same joint plane. For example, this adjustment allows a variation of plus or minus 2 mm on either side of a central position.

Preferably, each torch points radially outward. But a means of tilting the torch 21 is provided on the cassette. It is thus possible to have a slightly different incidence of the perpendicular to the tangent at the point of impact, while continuing to provide a supply of the wire to be welded in the joint plane.

In practice, the crown 11 is rotated in a first direction, for example the clockwise direction, and the 4 torches of the 4 cassettes on the same side are activated, in order to cover half of the circumference to be welded. Then the welding head is rotated in the opposite direction, for example the counterclockwise direction, so that the other 4 torches carry out the weld on the other half of the circumference to be welded. Thus the need for rotation of the welding head is limited. In an 8 torch case, each torch must provide a minimum weld bead of one-eighth in circumference. For the safety of the connections, the weld beads cover more than the minimum required in order to provide an overlap area with at least one of the adjacent beads in the clockwise or counterclockwise direction, for example of the order of 10°.

To optimise the kinematics, all the torches 18 are very exactly evenly distributed around the circumference of the crown 11. The movement requirement in an 8 torch configuration is of the order of 75°. To ensure this rotational drive, a toothed sector 22 is attached to the inside of the crown 11 to cooperate with a motorised toothed pinion 23.

According to the invention, the crown is swiveled in order to be tiltable relative to a plane P1 defined by the points of contact of the pistons of the first clamping means 13. The ball joint forms a pivot. The ball joint is here represented by the cooperation between a female ball joint 28 and a male ball joint 29.

Figure 4:
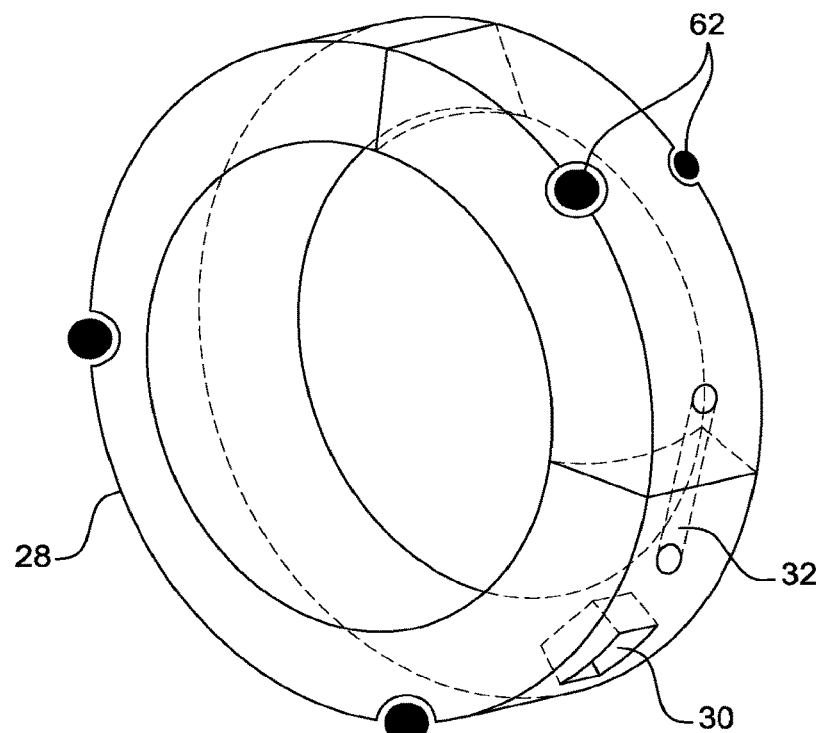
FIG. 4 is a perspective view of a female ball joint of a device according to the invention.
Figure 5:
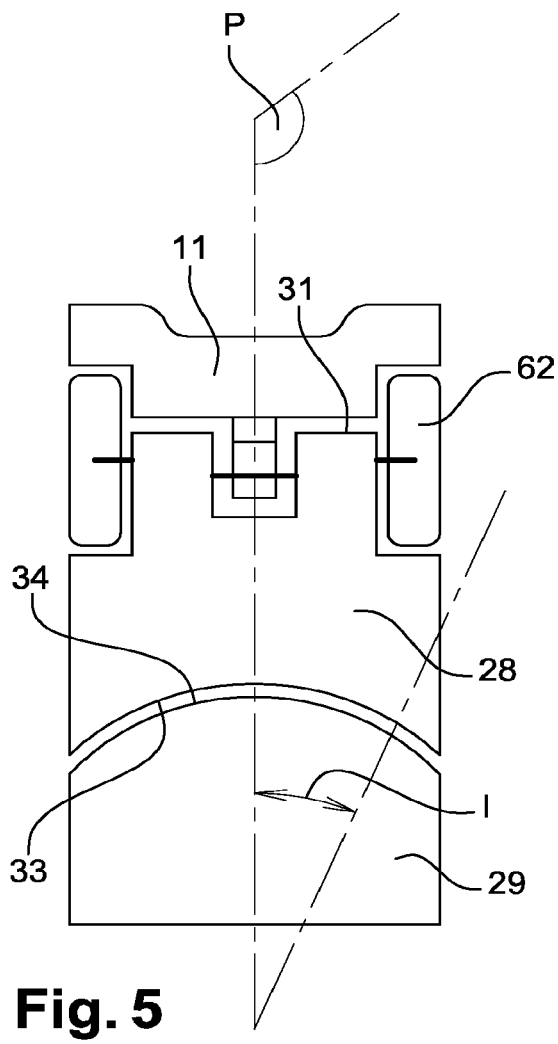
FIG. 5 is a schematic longitudinal sectional view of part of a ball joint according to the invention corresponding to a section plane VI-VI shown in FIG. 3.

The crown 11 is retained around the female ball joint 28. This female ball joint 28 comprises a housing 30 opening radially outwards, where the motorised toothed pinion 23 is disposed. The crown 11 is rotatable about this female ball joint 28. Rollers 62, FIGS. 4 and 5, are provided to facilitate sliding during rotation of the radially outer periphery 31 of the female ball joint 28 on the radially inner periphery of the crown 11. The rollers 62 can be carried by longitudinal axes, each axis being disposed in a corresponding bore 40 of the female ball joint 28.

The male ball joint 29 takes the shape of a closed ring attached to the inside of the female ball joint 28 forming an open ring. FIG. 4, the open ring of the female ball joint 28 can be closed and adjusted around the male ball joint 29 via a locking mechanism 32. The radially inner periphery 33 of the female ball joint 28 is concave. In a complementary manner, the radially outer periphery 34 of the male ball joint 29 has a convexity complementary to the concavity.

Figure 11:
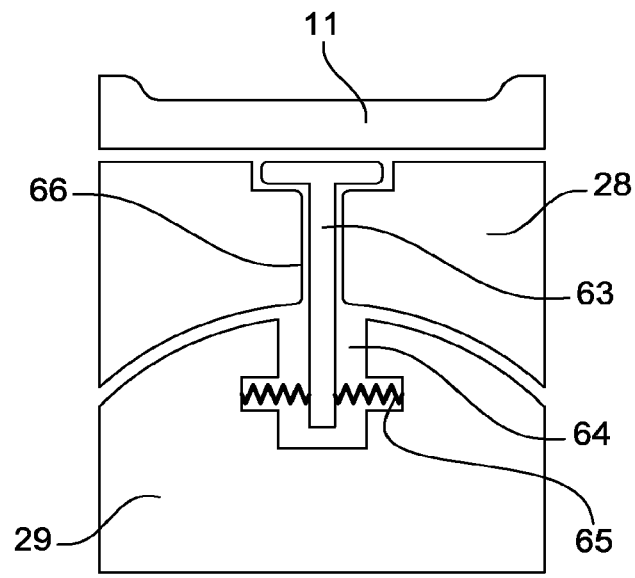
FIG. 11 is a schematic longitudinal sectional view of part of a ball joint according to the invention corresponding to a section plane XI-XI shown in FIG. 3.

The male ball joint 29 includes angular limiters 35, FIGS. 3 and 11, which limit the tilt that the female ball joint 28 can take relative to the male ball joint 29. The tilt I of the ball joint tolerates up to 0.5° or 10 mm measured axially along the axis X. In the example, there are 3 front angular limiters 35. In particular, an angular limiter 35 is obtained by the cooperation between one end of a pin 63 mounted radially through a bore 66 of the female ball joint 28 to engage in a recess 64 formed in the radially outer periphery of the male ball joint. The recess 64 is wider than the pin 63 in order to allow a certain angular tilting displacement. Because of this possible displacement, to allow centering of the female ball joint 28 on the male ball joint, the male ball joint has lateral retaining springs 65, oriented transversely to the plane of the ball, inside the recess 64.

Thus in addition to being able to be rotated about the longitudinal axis X, the welding head benefits from a degree of tilting freedom relative to this longitudinal axis X of the device.

The ball joint is designed so that it can be moved in translation along the axis X. The male ball joint is slidably mounted about the support 5. The male ball joint 29 has several bores 36 for sliding bars 49 allowing to adjust the axial position along the axis X, of the crown 11 between the two clamping devices deploying at the periphery of the support 5. In a position called "garage" position, the ball joint and the crown are axially pushed back to the rear of an annular housing 37 formed by two flanges 39 joined to the support 5. The two flanges 39 delimit an element called "spider". In the "garage" position, as for example in FIG. 9, the crown 11 is close to the plane P1.

The support 5 includes bores 38 formed in the flange 39 to be stiffened by axial tie rods, the axial tie rods connecting the two flanges together. The support 5 includes a central hollow shaft 41 retained by axial collars 42 on the flanges 39. The central hollow shaft allows to increase the bending stiffness. The internal diameter of the hollow shaft is, for example, 150 mm.

The implementation of a device according to the invention will be detailed in the procedure which will be given below.

Figure 7:
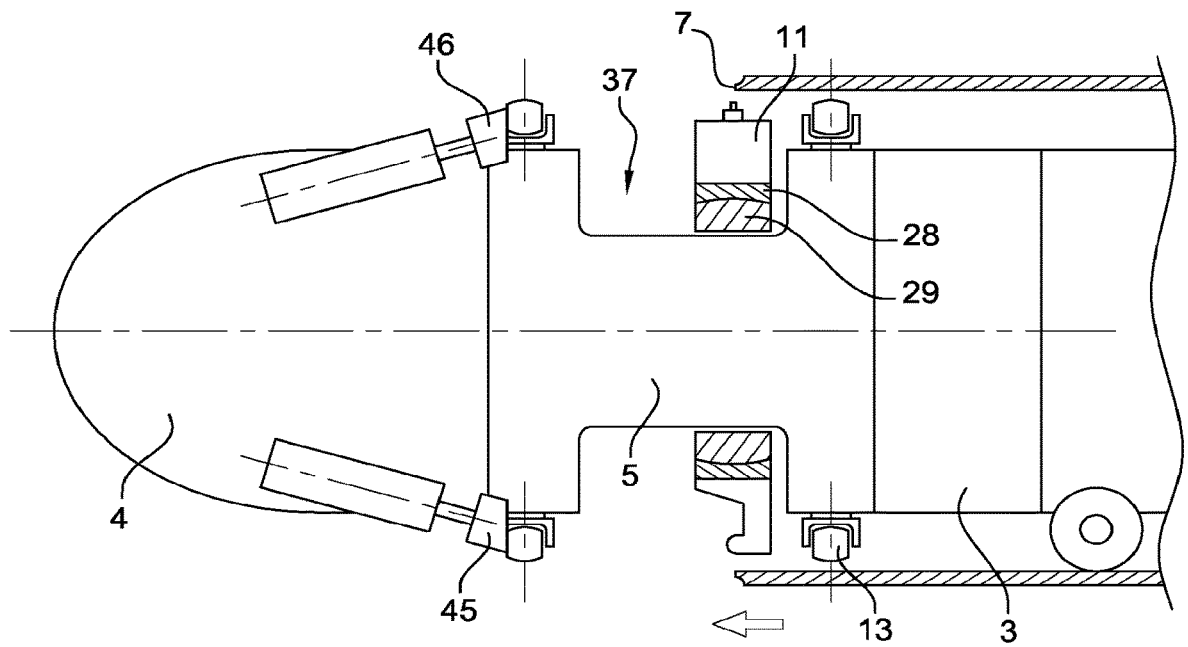
FIGS. 7 to 10 show schematic views in longitudinal section, along a broken section plane ABC as shown in FIG. 2, of a device according to the invention when placed in a first tube, then with the second tube provided opposite thereto.
Figure 8:
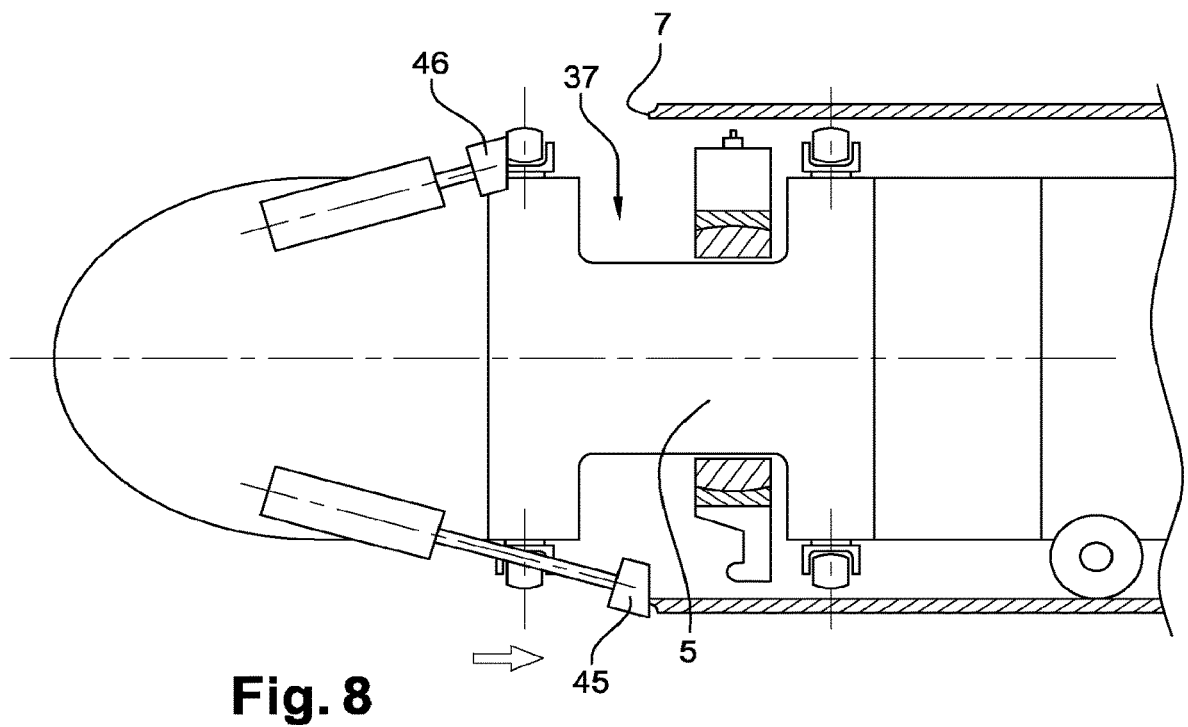

In FIG. 7, the device 1 is shown in the first tube moving forward until it reaches a position where the front frame 4 emerges sufficiently from the first tube to be able to deploy a low crutch 45 of the front frame 4. A first step consists in adjusting the axial position of the device 1 in the tube so as to contact the deployed crutch 45 with the chamfer of the distal end 7. When the crutch 45 is contacted, an operator can decide via the console 27 to stop the device from moving forward in the tube. The first clamping device 13 is then placed in order to axially immobilise the position of the device 1 in the tube at the end of this second step. At the end of the second step, the plane P1 is defined. During the first and the second step, the crown 11 carrying the welding head 12 is in the "garage" position, set back in its housing 37.

Figure 9:
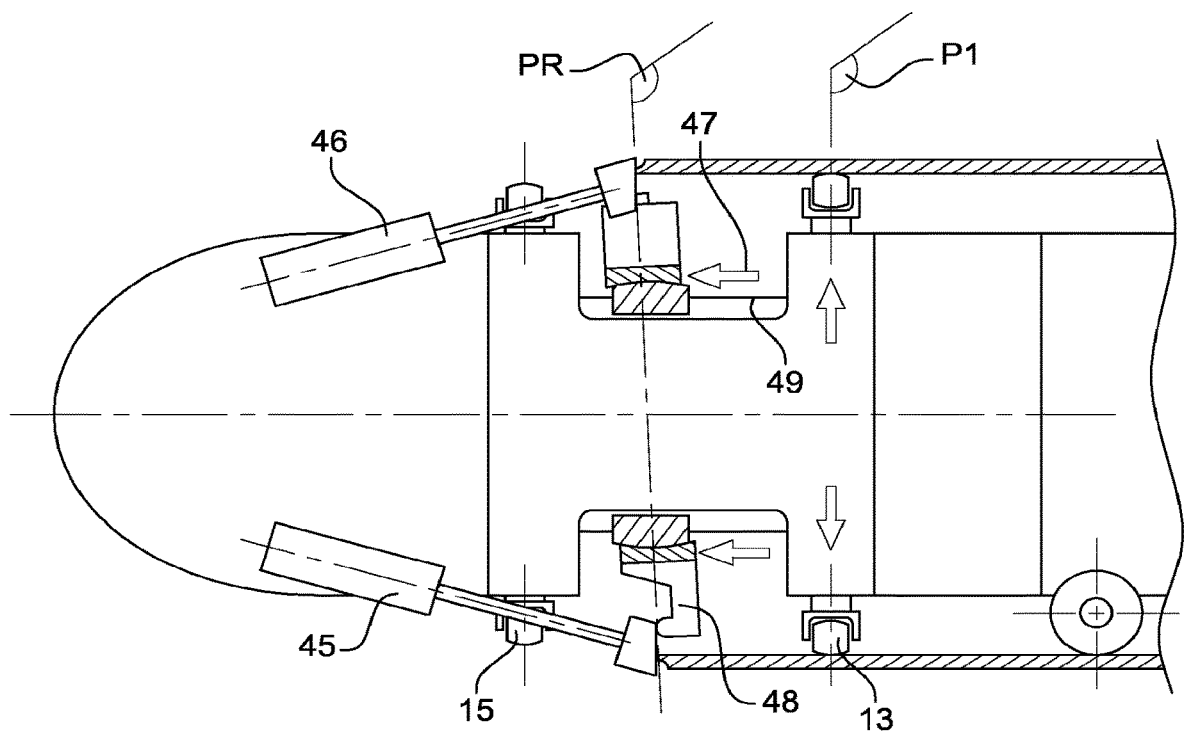

In a third step, FIG. 9, there is creation of the plane reference frame of the distal end 7 of the tube. Indeed, two upper telescopic abutments 46, mounted on the front frame 4, are deployed until they also contact the chamfer of the distal end 7. Three points sufficient to define a plane, the crutch 45 and the two upper abutments 46 form the identification means according to the invention and define the reference plane PR of the distal end 7. The plane PR can be tilted relative to the plane P1. And as shown in FIG. 9, there is then an indexing of the plane of the crown on the plane PR. To this end, the crown 11 is translated along the slide bars 49 via pushing cylinders 47, preferably 3 rear pushing cylinders 47 equally distributed in lateral support on the female ball joint 28. The support on the female ball joint 28 is transmitted in sliding of the male ball joint 29 on the slide bars 49. The final position of the crown 11 is determined by contacting the indexing fingers 48 carried by the crown 11 with the crutch 45 and the two upper abutments 46. In the example shown, the crown carries 3 indexing fingers such as 48. The rear pushing cylinders 47 adjust their pressure so that the 3 indexing fingers 48 are placed in the reference plane PR. Docking is mechanically controlled.

The plane of the indexing fingers 48 is adjusted to coincide with the plane of the torches. To help the identity between the plane of the indexing fingers 48 and that of the torches, the indexing fingers are adjustable axially and independently of each other via screw and locknut devices 50.

The position and the adjustment of the plane of the torches on the reference plane PR having been achieved, the position of the crown 11 is then immobilised by front pushing cylinders 51. It is preferably 3 front pushing cylinders 51 equally distributed in lateral support on the female ball joint 28. These front and rear pushing cylinders form a device for blocking the crown 11 in the longitudinal and tilted position relative to the plane P1.

Figure 10:
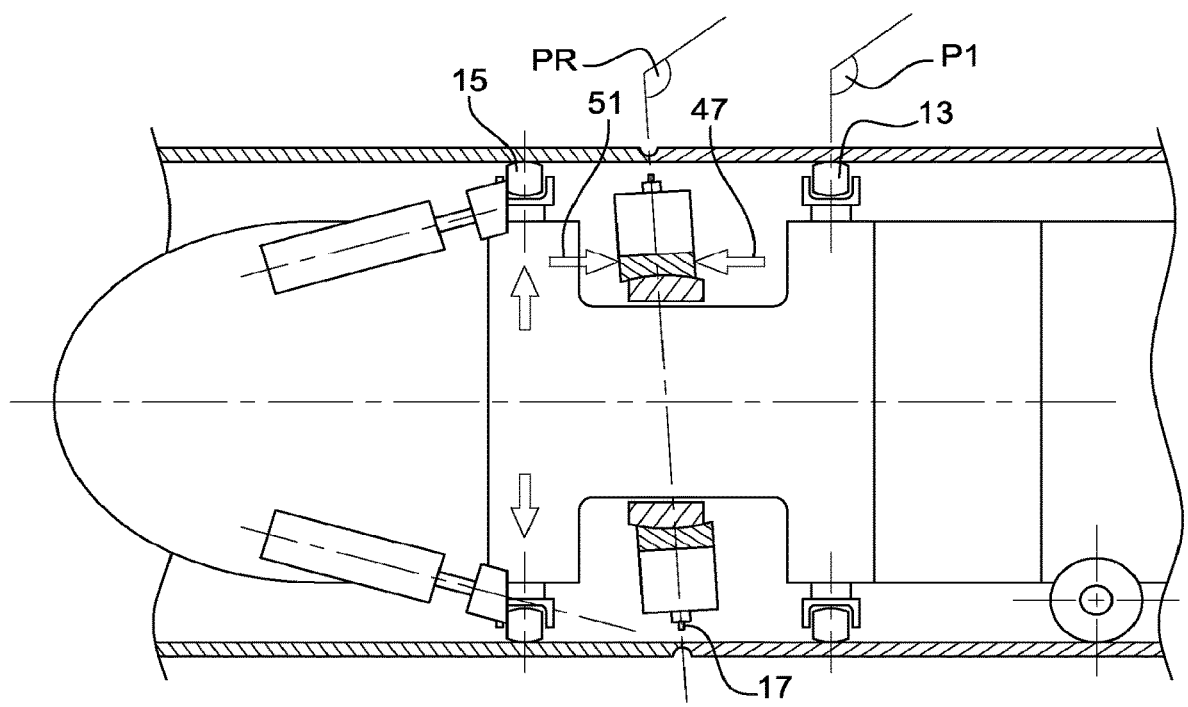

In a fourth step, for the supply of the second tube, FIG. 10, the crutch 45 and the two upper abutments are brought back against the front frame 4. When the position of the second tube relative to the device is optimised in terms of approximation with regard to the external indicator, the second clamping means is placed to immobilise the second tube opposite the first tube. Moreover, the pressure exerted by the second clamping means being strong, it allows to recircularise the second tube so that it conforms as best as possible to the first tube, in turn held by the first clamping means.

Finally, when the clamping and facing operations are optimised, the crown 11 carrying the welding cassettes can then be rotated to perform the weld bead.

The invention claimed is:

1. An internal clamping and welding device for joining tubes by their distal ends, the device comprising:
   a support including a first clamping means to cooperate with the inner surface of a first tube, and a second clamping means to cooperate with the inner surface of a second tube;
   a welding head mounted to rotate about the support, so as to allow welding on at least a portion of the internal circumference of a junction area formed between the first tube and the second tube; and
   a pivot such that the welding head is tiltable relative to the longitudinal axis of the device,
   wherein the pivot is such that the welding head is rotated in a plane which is tiltable relative to a clamping plane of the first clamping means,
   wherein the pivot is obtained by the cooperation between a female ball joint and a male ball joint of the support, the female ball joint being connected to a crown of the welding head,
   wherein the female ball joint being in the shape of an open ring and the male ball joint in the shape of a closed ring, and
   wherein the female ball joint is configured to rotate annularly about the male ball joint.

2. The device according to claim 1, wherein the pivot is axially movable between the two clamping means.

3. The device according to claim 1, wherein the welding torch is an arc welding torch with a continuously fed electrode wire and an electrode oscillated on either side of the tiltable plane.

4. The device according to claim 1, wherein the welding head includes a plurality of separate welding cassettes, each cassette being able to execute its proper welding program.

5. The device according to claim 4, wherein it includes a single motor for driving all the cassettes of the welding head.

6. The device according to claim 1, wherein the crown includes teeth on only a portion of its inner circumference to cooperate with a toothed pinion carried by the female ball joint.

7. The device according to claim 1, wherein the pivot is obtained by a hexapod.

8. The device according to claim 1, further comprising a crutch and upper abutments for identifying the tilt of a plane defined by the distal end of the first tube.

9. The device according to claim 8, wherein a crown of the welding head includes indexing fingers for indexing the tilt of the welding head relative to a tilt plane of the distal end of the first tube, the indexing fingers can cooperate in particular by abutment on the tilt identification means.

10. The device according to claim 8, wherein the indexing means include indexing fingers carried by the crown, these indexing fingers being able to be contacted with a crutch and upper abutments of the tilt identification means.

11. The device according to claim 9, wherein the indexing means include cylinders for blocking in position.

12. The device according to claim 1, further comprising clamping means for adjusting the coaxiality of the device in the first tube.

13. The device according to claim 1, wherein each clamping means includes respectively a plurality of pistons, each piston being able to exert a radial pressure greater than 15 tons.

14. The device according to claim 1, wherein the first and second clamping means are axially spaced along the longitudinal axis of the tubes such that they are less than 300 mm of axial distance.

15. A method for welding by means of a device according to claim 1, the method comprising:
  longitudinally inserting the device into a first tube;
  deploying a low crutch of a front frame of the device in order to limit the longitudinal insertion into the first tube when the crutch contacts a distal end of this first tube;
  placing the first clamping means to axially fix the position of the device in the first tube, the first clamping means extending in a plane P1;
  creating a plane reference frame of the distal end of the first tube using the crutch and two upper telescopic abutments of the frame, the upper telescopic abutments being deployed until they contact the distal end;
  indexing the plane of the crown carrying the welding torch on the plane reference frame by translating the crown along slide bars and contacting indexing fingers carried by the crown with the crutch and the two upper abutments;
  blocking the crown in the longitudinal and tilted position relative to the plane P; and
  placing a second tube facing the first tube.

16. The welding method according to claim 15, wherein the translation of the crown is obtained by lateral bearings on the female ball joint causing the male ball joint to slide on the slide bars.

17. The welding method according to claim 16, wherein after blocking the crown in a longitudinal and tilted position relative to the plane P1, and before the supply of the second tube, the crutch and the two upper telescopic abutments are retracted into the first tube.

* * * * *